United States Patent
Edwards et al.

(10) Patent No.: US 7,085,841 B2
(45) Date of Patent: Aug. 1, 2006

(54) INDUSTRIAL CONTROLLER INTERFACE PROVIDING STANDARDIZED OBJECT ACCESS

(75) Inventors: Jayme Edwards, Mukwonago, WI (US); David J Lillie, Pewaukee, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 644 days.

(21) Appl. No.: 09/967,296

(22) Filed: Sep. 28, 2001

(65) Prior Publication Data

US 2003/0084201 A1 May 1, 2003

Related U.S. Application Data

(63) Continuation-in-part of application No. 09/904,929, filed on Jul. 13, 2001.

(51) Int. Cl.
*G06F 15/16* (2006.01)

(52) U.S. Cl. .................. 709/230; 709/224; 719/328

(58) Field of Classification Search .......... 707/102, 707/10; 719/315–316, 321, 310, 328; 709/230, 709/250, 203, 217, 224; 370/231; 705/59, 705/75, 78
See application file for complete search history.

(56) References Cited

U.S. PATENT DOCUMENTS 5,546,584 A * 8/1996 Lundin et al. ............. 719/315
5,848,415 A * 12/1998 Guck ......................... 707/10
6,061,603 A   5/2000 Papadopoulos et al.
6,070,196 A * 5/2000 Mullen, Jr. ................. 709/250
6,201,996 B1  3/2001 Crater et al.
6,356,529 B1 * 3/2002 Zarom ....................... 370/231
6,549,937 B1 * 4/2003 Auerbach et al. .......... 709/206
6,591,272 B1 * 7/2003 Williams .................... 707/102
2001/0011341 A1  8/2001 Hayes, Jr. et al.
2002/0046239 A1  4/2002 Stawikowski et al.
2002/0067370 A1  6/2002 Forney et al.
2002/0174178 A1 11/2002 Stawikowski
2003/0105974 A1  6/2003 Griffin et al.
2003/0163513 A1  8/2003 Schaeck et al.
2004/0034799 A1  2/2004 Mikami

FOREIGN PATENT DOCUMENTS

DE   199 29 933 A1   1/2001
EP   0 825 506 A2    2/1998
EP   1 193 948 A2    4/2002

OTHER PUBLICATIONS

Koning "Algorithms for translating interaction protocols into a formal description" 1999 IEEE, pp. 810-815.*
Knaus et al. "Highlighting Relevant Passage for Users of the Interactive SPIDER Retrieval System".*

(Continued)

*Primary Examiner*—William Thomson
*Assistant Examiner*—George L. Opie
(74) *Attorney, Agent, or Firm*—Amin & Turocy LLP; William R. Walbrun

(57) ABSTRACT

An interface for an industrial control system provides, at a server side, a set of objects for programmer use. Instances of object provider objects, linked to each of the software objects, provide a uniform interface for the software objects allowing software objects from different vendors to be used while preserving a common programmer interface.

23 Claims, 4 Drawing Sheets

OTHER PUBLICATIONS

XP 002216674, May 8, 2000, Don Box et al.
"Virtual Java Devices Integration of Fieldbus Based Systems in the Internet", Lumpp et al., Universitat Tubingen, Tubingen, Germany; 1998, IEEE, pp. 176-181, XP-001003488.

SOAP Cleans Up Interoperability Problems on the Web, Perspectives, Jan./Feb. 2001, XP-002216675/XP-002216700.

European Search Report, EP 04 02 2561, mailed Nov. 12, 2004.

* cited by examiner

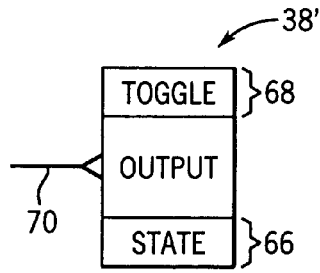
FIG. 4
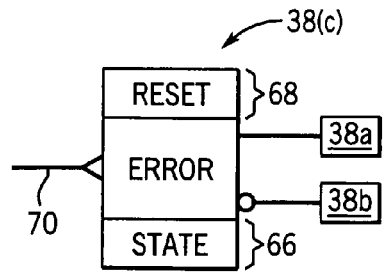
FIG. 6
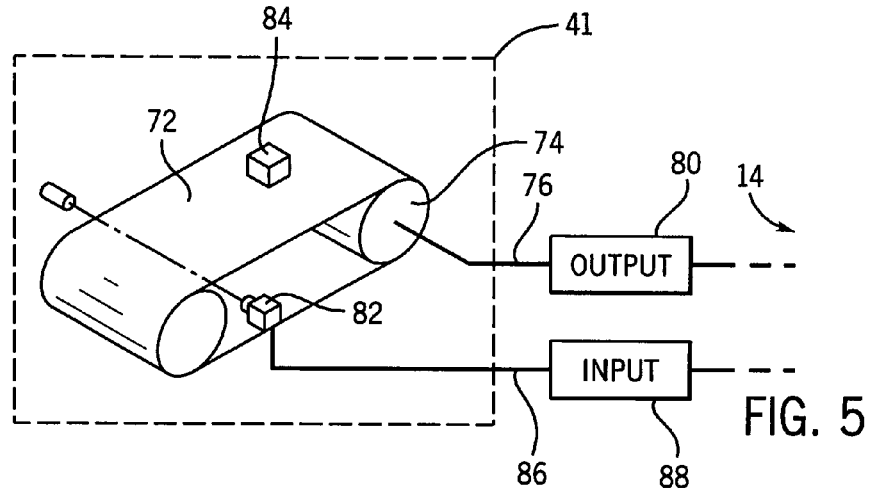
FIG. 5
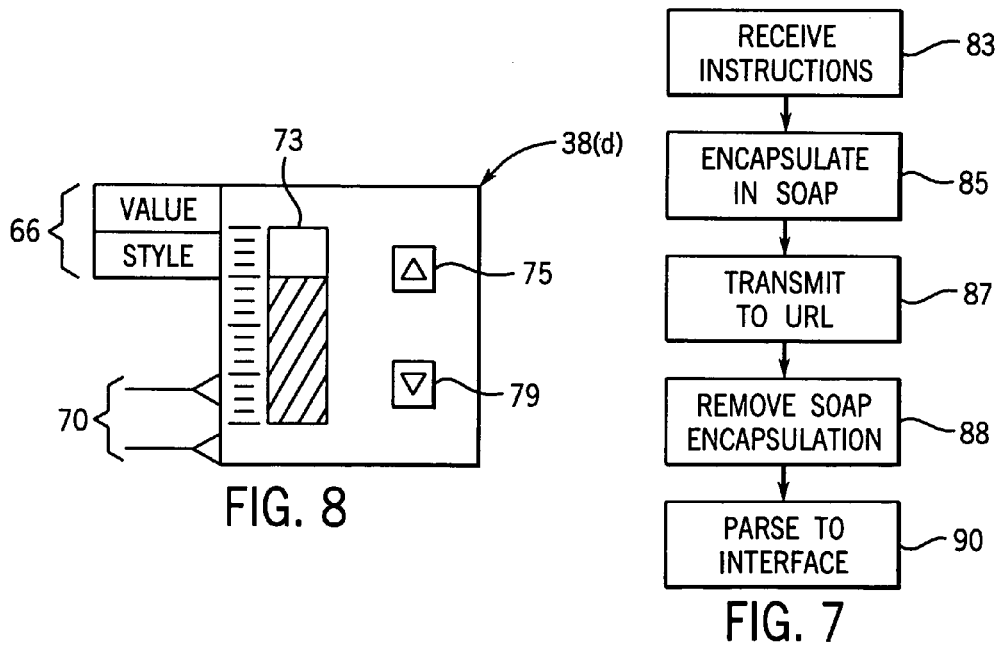
FIG. 8
FIG. 7

INDUSTRIAL CONTROLLER INTERFACE PROVIDING STANDARDIZED OBJECT ACCESS

CROSS-REFERENCE TO RELATED APPLICATIONS

This application is a continuation-in-part of a U.S. application Ser. No. 09/904,929 filed Jul. 13, 2001 entitled: "Internet Object Interface for Industrial Controller", which was published as U.S. patent application Publication No. 2003/0051074 on Mar. 13, 2003.

STATEMENT REGARDING FEDERALLY SPONSORED RESEARCH OR DEVELOPMENT

BACKGROUND OF THE INVENTION

The present invention relates to a computer program providing an interface for an industrial controller, and in particular, to a program providing a uniform interface to different software objects, possibly from different vendors.

Industrial controllers are special purpose computers used for the control of industrial processes and the like. While executing a stored control program, they read inputs from the control process and, for the logic of the control program, provide outputs to the control process. Such controllers differ from conventional computers in two major respects.

First, the architecture of the industrial controller is designed to allow it to be easily reconfigured to meet the demands of the particular process being controlled. Normally, therefore, the industrial controller is in modular form. The user selects different modules to be assembled together in a rack and linked together on a back plane in the rack. Varying numbers of inputs and outputs are accommodated with input/output (I/O) modules that may also fit in the rack or in a remote rack connected to the first rack over a control network.

The ability to modify the industrial controller to match the control process is furthered by writing custom program to be executed on the industrial controller. These programs may be both for the control of the industrial process and to provide human machine interfaces (HMIs), the latter which often depict a graphic representation of all or part of the process animated to show its current operating state. The use of custom written software makes in important to provide a simple yet powerful programming environment.

At times, it can be desirable to monitor or control an industrial process from a site that is remote from the industrial controller and the process itself. Such remote operations are well known, for example, using dedicated phone lines in proprietary communication protocols between the industrial controller and a remote HMI. With the development of the Internet and the World Wide Web, dedicated phone lines may be replaced within Internet-based communications between a remote program and a Web server communicating with or incorporated as part of the industrial controller. The promise of the Web is that any Internet connected computer can become a remote terminal for an industrial controller, or the industrial controller itself (when the Internet connected computer is loaded with the appropriate PC-Based Controller Software and Drivers).

Widespread use of Internet-based remote operation of industrial controllers is hampered by the need to carry specialized software for the remote computer allowing it to communicate with the industrial controller. Programs implementing, for example, complex graphical remote human machine interfaces, can be so large as to be cumbersome to transport and load onto the remote machine. Software maintenance of such dispersed remote programs, each of which may be customized to a particular industrial controller is extremely difficult.

In the parent application to the present application entitled "Internet Object Interface For Industrial Controller", U.S. Ser. No. 09/904,929, assigned to the assignee of the present invention and hereby incorporated by reference, an object based interface is described in which the remote computer executes an applet that allows it to communicate with an interface server program. The interface server program allows the discovery, construction, and use of pre-existing software objects held at the industrial controller. The objects provide extremely small footprint to the remote program while simplifying the task of developing complex program.

The development of software objects for a human machine interface is a complex task, which could be prohibitively expensive in light of the size of the industrial control market. Ideally, therefore, it would be possible to use pre-existing objects developed for larger markets such as those related to general purpose programming languages such as COM, C++, Java, XML, or commercially available graphics packages. Selecting objects from only a single provider may offer a uniform programming environment, but result in a functionally limited set of objects. While these objects may be supplemented with objects from additional vendors, switching between object protocols of different vendors can be cumbersome. Further, using any proprietary object set carries with it the risk that the objects will be modified by the vendor or that the vendor will cease supporting particular objects or all objects. This lack of stability in the programming environment is undesirable in the area of industrial control where considerable cost is invested in the custom controller program.

BRIEF SUMMARY OF THE PREFERRED EMBODIMENT

The present invention provides a "standard object protocol" overlying a set of different software object types. A set of specially prepared "object providers" link an arbitrary set of proprietary software objects with a client program using this standard object protocol. Each object provider translates between the standard object protocol and the proprietary protocol used by an associated one of the proprietary software objects. In this way, the invention makes the peculiarities of object protocols of proprietary objects invisible to the programmer, allowing software objects to be mixed from different vendors and to be changed in the future without unduly affecting the client program that uses them. By freeing the programmer from proprietary object protocols, improved stability, uniformity, and functional range of the objects is provided.

Specifically, the present invention provides an object-based interface for an industrial control system. In the invention, the interface receives communications from a client program employing a standard object protocol. The interface provides a set of software objects including at least two proprietary objects having differing proprietary object protocols that also differ from the standard object protocol. At least two object providers communicate with the two proprietary objects, one with each, to translate between standard object protocol and the protocol used by the proprietary objects.

It is thus one object of the invention to provide a standard object protocol that may span and unify a programmer's use of third party or proprietary software objects, each of which may have a unique and differing protocol.

It is another object of the invention to allow flexibility in changing the underlying software objects as competition and innovation provide improved and new software object models.

The standardized and proprietary object protocols may control object features such as object creation, object destruction, setting parameters of the objects, and invoking methods of the objects.

Thus it is another object of the invention to extract the essential features of a variety of objects, such features as may be used to provide a framework for translation between arbitrary object protocols and a standard object protocol.

The standard object protocol may include discover instructions and the object providers may respond to the discovery instructions by identifying object features of the software objects with which they are associated. These object features may include the parameters of the objects and the methods of the objects.

Thus, it is another object of the invention to provide for a standard object protocol that accommodates variations between objects by allowing dynamic discovery of object features.

A client program may communicate with the server program over a network, and the object providers may be associated with network addresses.

Thus, it is another object of the invention to provide a system well adapted to remote operation over the Internet or the like.

The object providers may be software objects that provide encapsulation of data passed to the proprietary software objects.

Thus, it is another object of the invention to provide an interface to proprietary software objects that itself provides the benefits of the object model.

The foregoing objects and advantages may not apply to all embodiments of the invention and are not intended to define the scope of the invention, for which purpose claims are provided. In the following description, reference is made to the accompanying drawings, which form a part hereof, and in which there is shown by way of illustration, a preferred embodiment of the invention. Such embodiment also does not define the scope of the invention and reference must be made therefore to the claims for this purpose.

BRIEF DESCRIPTION OF THE DRAWINGS

FIG. 4 is a graphic representation of one of the objects of the server of FIG. 3 showing its properties, methods and events;

FIG. 5 is a simplified example of an industrial process including a conveyor belt showing an output object for actuating the conveyor belt in an input object for measuring passage of objects on the conveyor belt;

FIG. 6 is a graphical representation similar to that of FIG. 4 showing construction of an object making use of the input and output objects of FIG. 5;

FIG. 7 is a flow chart showing transmission of instructions from the remote terminal to the server;

FIG. 8 is a graphical display object that may be implemented by the present invention;

DETAILED DESCRIPTION OF THE PREFERRED EMBODIMENT

System Overview

Figure 1:
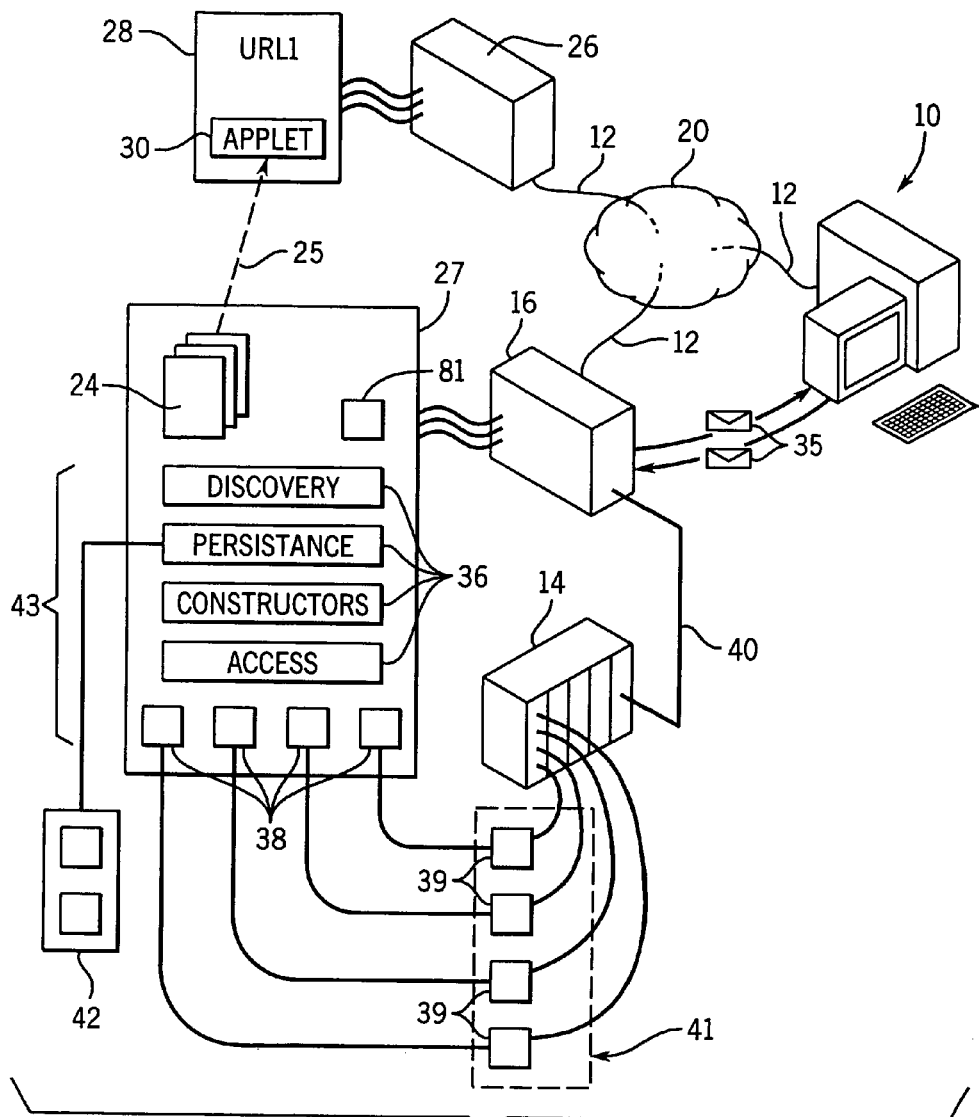
FIG. 1 is a simplified block diagram of an Internet connection between a remote browser and two servers, the first which includes an HMI applet and the second which provides an interface to an industrial controller.

Referring now to FIG. 1, the present invention will be described in the context of a human machine interface (HMI) implementable on a browser-enabled, remote computer 10. Generally, the present invention will be applicable to other remote operations requiring an interface to an industrial control system over the Internet.

Figure 3:
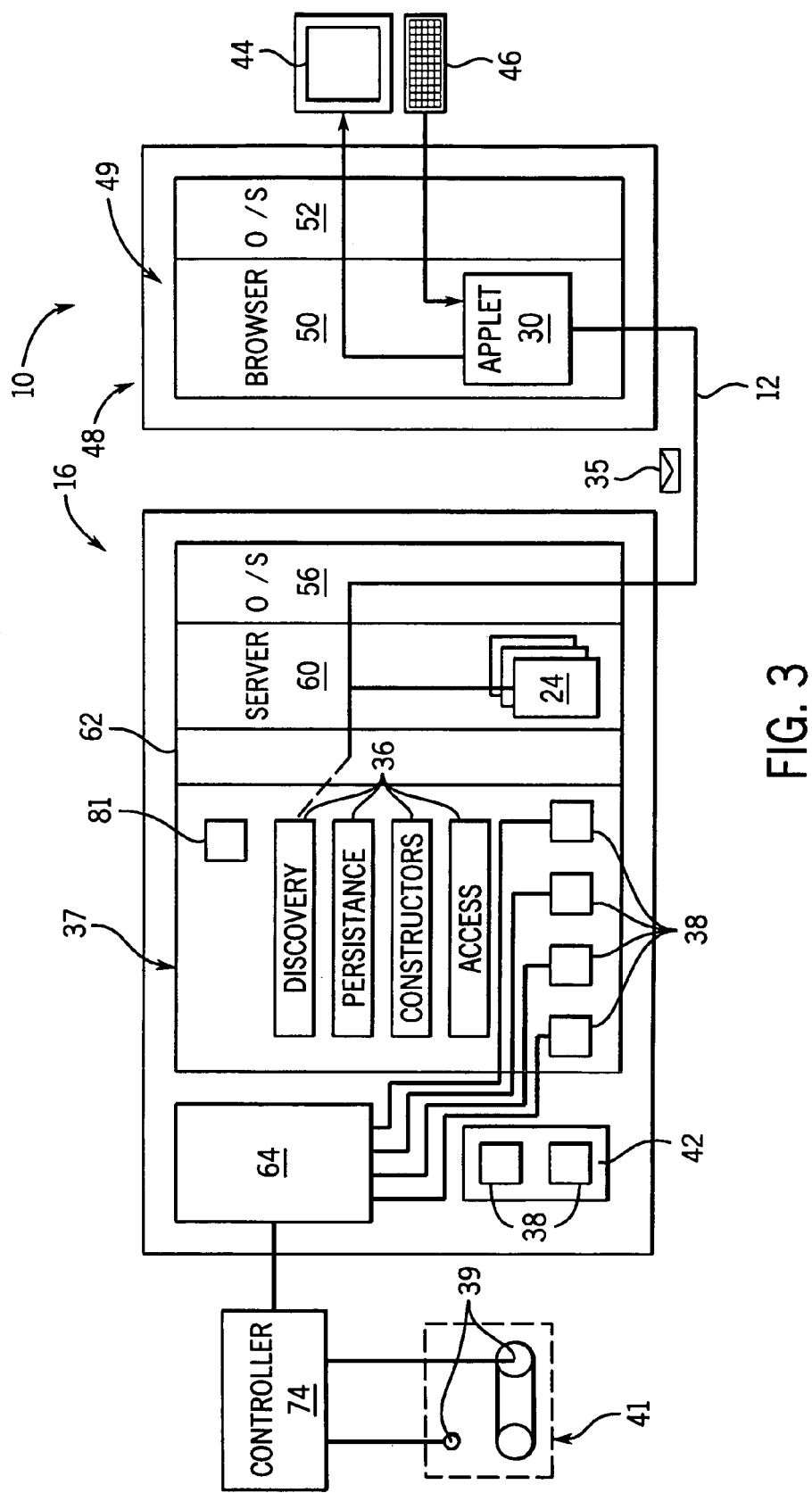
FIG. 3 is a detail block diagram of the software components of the browser and server showing structures within the server for implementing an object-based interface protocol and their connection to an external industrial controller.

Referring also to FIG. 3, the remote computer 10 includes a display screen 44 and user input device 46 such as a keyboard communicating with a processor system 48 executing stored programs 49. Typically, the programs 49 will include an operating system 52 such as the Windows NT operating systems from Microsoft Corporation of Redmond, Wash. The programs 49 also include a browser such as the Internet Explorer also commercially available from Microsoft. 50 implementing a Java Virtual Machine (JVM), such as the JAVA Plug-In Product available from Sun Microsystems of Palo Alto Calif.

The remote computer 10 may be a desktop machine as depicted or a laptop, palmtop or other browser enabled computing device.

The remote computer 10 may communicate over Internet connection 12, being a standard phone line or wireless link or other functionally equivalent medium, to the Internet 20 through which communications can be established with Web server 26 (shown only in FIG. 1) and Web server 16 through standard Internet protocol well known in the art. Web server 16 either contains or communicates in turn with an industrial controller 14 which operates to control an industrial process 41 through inputs and outputs 39. The Web servers 16 and 26 may be, for example, standard architecture servers executing the Apache server software under the Linux operating system, both commercially available as distributions from a number of sources including RedHat Software of Durham, N.C.

Referring specifically to FIG. 3, the Web server 16 executes the operating system 56 (such as Linux) and server software 60 (such as Apache) so as to serve one or more predefined Web pages 24 as will be described. The server software 60 includes a module allowing for the user of the Simple Object Access Protocol (SOAP) implemented by the Apache server such as allows for passage of object-oriented instructions as will be described) using Hypertext Transfer Protocol, the standard Web protocol well known in the art. Web server 16 also holds in its memory 27 persistent storage area 42 in which parameters necessary for restoring persistent objects 38 may be stored.

Generally, the object-oriented instructions are passed by the server software 60 to a parser 62 forming part of the present invention, which forwards the object-oriented instructions to the server-side HMI program 37 (as will be described) which effects basic object manipulations including instantiation of new objects and invocation of object methods and transmission of object events.

Generally, the parser 62 reads the name of the object-oriented instructions contained within the encapsulation of a SOAP envelope 35 and passes it to one of a number of object interface programs 36 making up the server-side HMI program 37.

The particular object interface program 36 receiving the instruction is determined according to the instruction name and standard language parsing techniques well known in the art. Generally, the object-oriented instructions will fall into the categories of object discovery, object persistence, object constructors, and object access, each indicated by a separate application program. More generally, the object-oriented instructions refer to and operate upon the objects 38 according to well-known object-oriented techniques. Generally the object interface program 36 are associated with a universal resource indicator (URI) 43 and thus define an endpoint.

The objects 38 created and manipulated by the object interface programs 36, per the object-oriented instructions received from the remote computer 10, are linked through a communications program 64 with the industrial controller 14, so that the objects 38 can be used as a path for reading and writing the inputs and outputs 39 of the industrial process 41. In this respect, the objects 38 serve to encapsulate input and output data, however other objects 38 not directly related to the data, for example, graphics objects having arbitrary inputs, are also contemplated.

Figure 2:
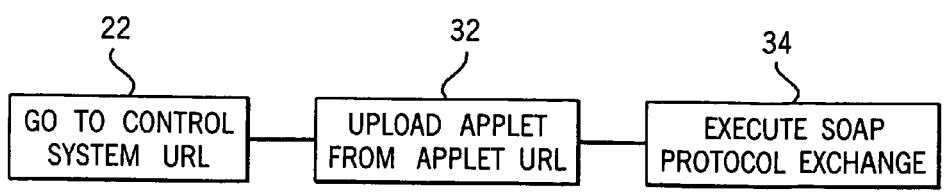
FIG. 2 is a flow chart showing the connection of the browser to the industrial controller for the implementation of an HMI.

Referring to FIGS. 1, 2 and 3, a user desiring to open an HMI with the industrial controller 14 first instructs the browser 50 executing on the remote computer 10 to connect to Web server 16 communicating with the industrial controller 14, as indicated by process block 22 of FIG. 2. The connection is made through the Internet 20 by providing the browser 50 with the universal resource locator (URL) address associated with a Web server 16.

In response to this connection, a Web page 24 corresponding to the URL is served by the Web server 16. In a preferred embodiment of the invention, the Web page 24 directs the browser 50 on remote computer 10 through the Internet 20 to a second Web page 28 on Web server 26 having a different URL from that of Web page 24. This redirection is indicated by dotted arrow 25 in FIG. 1.

Web page 28 contains an applet program 30 such as may be written in the Java language promulgated by Sun Microsystems of Palo Alto, Calif., well known in the art. The applet program 30, according to standard Web protocols, is loaded into the browser 50 of the remote computer 10 to be executed under the browser 50 as indicted by process block 32 of FIG. 2. In an alternative embodiment, the redirection of arrow 25 can be to a different Web page on the same Web server 16, however, this does not provide the benefit of centralized distribution of the applet program 30 as will become apparent from the following description. Executing the applet program 30 as indicated by process block 34 of FIG. 2 causes the browser to exchange data with the Web server 16 using the SOAP protocol for the exchange of object-oriented instructions within the encapsulation of a SOAP envelope 35.

Object Interface

Referring now to FIG. 4, the server-side HMI program 37 provides a standard set of preconfigured I/O objects that encapsulate physical inputs and outputs 39 of the industrial controller 14. For example, output object 38' may provide a binary output corresponding to an output 39 of the industrial controller 14 such as may control a particular device in the industrial process 41. Per standard object convention, the object 38' provides a number of properties 66 that represent variables affecting the state of the object 38'. In this example of a binary output object 38', only a single property indicating either that the output is ON (i.e., TRUE or HIGH) or OFF (i.e., FALSE or LOW) is provided. As described through the agency of the communications program 64 (shown in FIG. 3) this state property 66 may be written to or read to reveal or change the corresponding output 39 associated with the industrial controller 14.

The object 38' also includes a method 68 invoking code internal to the object 38' for toggling the output state property in this case that is changing the state from ON to OFF or from OFF to ON depending on its previous state.

The output object 38 may also provide for events being signals provided by the object 38' under certain conditions, in this case, a state change event 70.

In a preferred embodiment, each input and output 39 of the industrial controller 14 will have an I/O object 38 assigned to it; however, other abstract objects 38 may also be created. As will be described, these abstract objects 38 may be constructed from the remote computer 10 and may have the properties of persistence, that is, remaining even after the remote computer 10 has logged off.

Referring now to FIG. 5, in a simple controlled process 41, a conveyor belt 72 may be operated by a motor 74 receiving a signal 76 from an output 80 of the industrial controller 14. That output 80 may have a corresponding output object 38a as shown in FIG. 6. A photoelectric sensor 82 may be positioned over the top of the conveyor belt 72 to detect the passage of parts 84 across the conveyor belt 72. A photoelectric sensor may produce a signal 86 received by input 88 communicating with the industrial controller 14 and having a corresponding object 38b as shown in FIG. 6. The two I/O objects 38a and 38b may be connected to an abstract "error" object 38c that may be instantiated by the user at the remote computer 10 using object-oriented instructions passed in the SOAP envelopes 35. The error object 38c in this example, detects proper operation of the conveyor belt 72 as indicated by the state property of object 38a and regular events from the input object 38b indicating periodic interruption of the photoelectric sensor 82 by parts 84. If regular interruptions do not occur, the error object 38c produces an error state being a property 66 and an error event 70. The error object 38c may also include a reset method 68 providing for causing a resetting of its output error signal event 70. The abstract objects 38 may also include graphical display object.

As will be appreciated to those of ordinary skill in the art, the number of I/O objects 38 and the number and type of other abstract objects 38 (such as the error object 38c) will vary according to controlled process 41 and the desired HMI. The objects 38 may include not only logical objects as shown but also graphic display objects such as meters and buttons that may appear on the screen 44 of the remote computer to assist in communicating information about the industrial process 41.

For example, referring now to FIG. 8, an object 38*d* may provide for a graphic element to be communicated to the browser of remote computer 10. Here the graphic element shown is a bar graph control having a bar graph display 73 and up and down buttons 75 and 77 such as may be activated by the user to control the underlying object whose output is reflected by bar graph display 73. Here two properties 66 may exist, one holding the value of the bar graph display 73 and one setting a style from among a number of styles of the bar graph display. The display object 38*d* may also produce events 70 being a pressing of the up and down buttons 75 and 77. The events and the value may be set to connect to other objects either baseline objects or those created by the user. The graphic elements may generally include display elements such as meters, digital readouts, and gauges, and may also include graphic control elements such as text entry boxes, buttons and slider bars.

Through the use of the object paradigm, a centrally distributed applet program 30 may provide for the ability to construct a variety of HMI's for different industrial processes 41 invoking the objects 38 as necessary to implement certain features of the HMI through the interface of the Internet. The objects 38 thus allow the applet to be small and for the applet developer to avoid the need to write functions already provided by the objects. By providing for persistence of the constructed objects at the server side, complete flexibility of remote computer location and type is still preserved, making it possible to call up a particular HMI for an arbitrary industrial controller 14 from any browser enabled remote computer 10 anywhere in the world.

Object Interface Instructions

The ability to create a desired HMI through the applet program 30 for an arbitrary industrial controller 14 requires that the I/O objects 38 and other standard abstract objects 38 be discoverable remotely. Accordingly, the present invention provides a special set of object-oriented instructions that allow for discovery of the objects 38 at a particular Web server 16 along with their properties, methods, events, and other characteristics as follows:

TABLE I

Object Discovery Instructions

| INSTRUCTION | EXPLANATION |
|---|---|
| GetEndpoints | Reply to the remote computer 10 with a list of URIs 43 available at the Web server 16. |
| GetObjects | Reply to the remote computer 10 with a list of objects 38 available at the Web server 16 on a given Endpoint. |
| GetConstructors | Reply to the remote computer 10 with a list of all constructors for creating new objects available at the Web server 16. |
| GetProperties | Reply to the remote computer 10 for a particular object with a list of all of the object's properties. |
| GetActions | Reply to the remote computer 10 for a particular object with a list of all of the object's methods. |
| GetSubscription | Reply to the remote computer 10 for a particular object with a list of all of the object's events. |

The discovery instructions do not change with changes in the industrial process 41 (for example I/O) or even in upgrades of the applet and thus can be standardized at each Web server 16. On the other hand, the values returned by the discovery instructions change depending both on the industrial process 41 and its control, principally in the form of what objects 38 are available, allowing the precise configuration of the HMI to vary considerably under identical applet programs 30. The implementation of the object discover instructions is performed by the DISCOVER object interface programs 36 which reviews a table holding object definition as is created for the I/O objects during configuration of the industrial controller 14 and for abstract objects by the HMI program designers.

The flexibility of the HMI using the applet program requires persistence of the objects generated (so that the objects called by the HMI do not need to be re-instantiated for each session) so the present invention also provides a set of persistence instructions that provide for persistence of an object created by a remote user even after the user has logged off.

TABLE II

Object Persistence Instructions

| | |
|---|---|
| GetLoadParameters | Reply to the remote computer 10 with a file name for a file holding the parameters for an identified object that must be loaded for the object to be resolved into a persisted state. |
| GetSaveParameters | Reply to the remote computer 10 with a file name for a file holding the parameters for an identified object that must be saved for the object to be stored into a persisted state. |
| Load Object | Loads a previously instantiated and saved object. |
| Save Object | Saving a previously instantiated object using the GetSaveParameters returned file name. |

The Object persistence instructions are implements by the PERSISTENCE object interface program 36 which saves and loads the necessary instantiation data from a non volatile memory portion forming the persistent storage area 42 and which records the file name according to well known file storage techniques.

The present invention contemplates a complete customization of the HMI by the remote user and thus provides for the construction of objects necessary to create that interface according to standard object-oriented techniques. In this regard, two object instantiation instructions are provided as follows:

TABLE III

Object Instantiation Instructions

| | |
|---|---|
| CreateObject | Respond to an instruction from the remote computer 10 to create an instance of an object based on the GetConstructors discovery performed earlier. |
| ReleaseObject | Respond to an instruction from the remote computer 10 to release the memory used for a specified object. |

The object instantiation instructions are implemented by the CONSTRUCTOR object interface program 36 using well-known object construction techniques.

The final set of object access instructions provide access to the properties, methods, and events of the object so that they may be read or written to as far as their properties or having their methods invoked or being notified upon events in a subscription process.

TABLE IV

Object Access Instructions

| | |
|---|---|
| InvokeAction | Respond to an instruction from the remote computer 10 to invoke a method of an object such as may have been revealed by the discovery instructions above. |
| GetProperty | Respond to an instruction from the remote computer 10 to read a property of an object as may have been revealed by the discovery instruction get properties above. |
| SetProperty | Respond to an instruction from the remote computer 10 to write to a property of an object as may have been revealed by the discovery instruction set properties above |
| Subscribe | Respond to an instruction from the remote computer 10 to subscribe to an event of an object. |
| CancelSubscription | Respond to an instruction from the remote computer 10 to cancel a subscription to an event of an object. |

The access object instructions are executed by an ACCESS object interface program 36 using object access techniques known in the art of object-oriented programming. The management of subscriptions to events is handled by notification handler 81 being part of the server side HMI program which accepts messages denoting events from enables subscriptions into an event queue and processes messages to the remote computers accordingly.

The objects may in this manner send messages to the applet program over the Internet, which provide part of an effective application programmer's interface or API.

Referring now to FIGS. 3 and 7, a typical interaction between the browser 50 on remote computer 10 and Web server 16 will start by the reception of one or a set of object-oriented instruction from the applet program 30 as initiated by the user to be transmitted by the applet program 30 as indicated by process block 83.

The applet program 30 as indicated by process block 85 then encapsulates the object-oriented instruction in SOAP protocol for transmission through the browser 50 according to standard techniques used in browser operating system interaction. The browser 50 as indicated by process block 87 transmits this SOAP envelope 35 to the URL of the Web server 16 where it is received as indicated by process block 89 and the SOAP encapsulation removed by the server software 60.

The underlying object-oriented instructions are passed to the parser 62 as indicated by process block 90 and then passed to the server-side HMI program 37 for processing as has been described.

Standard Object Protocol

Figure 9:
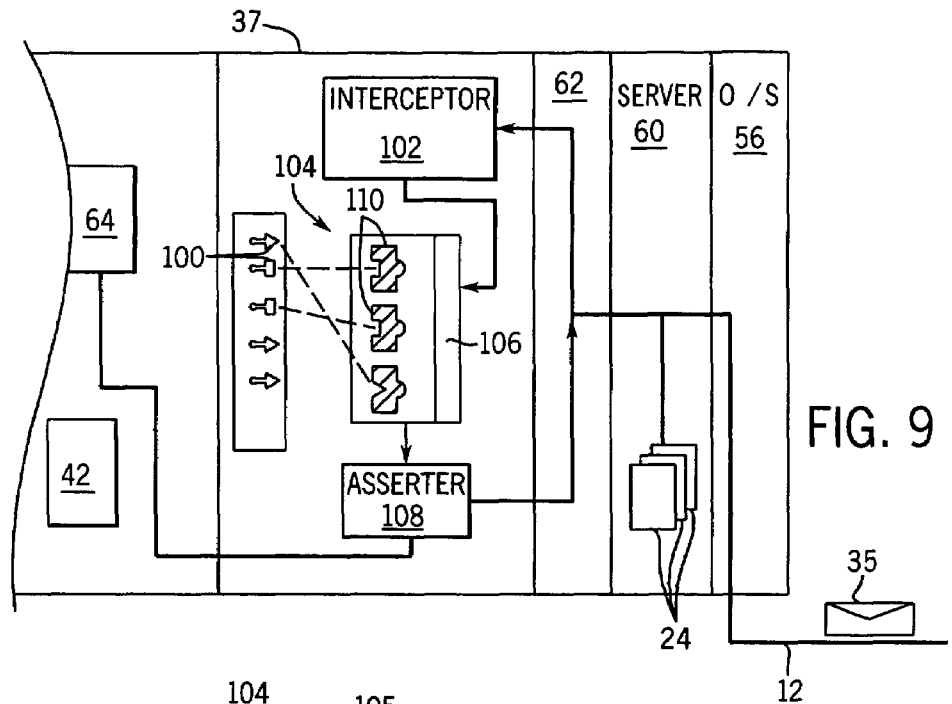
FIG. 9 is a fragmentary block diagram similar to FIG. 3, showing an interface of the present invention implemented by the server to provide for a standard object protocol including object providers forming translating between the standard object protocol and proprietary objects.

Referring now to FIG. 9, the objects 38 provided by the server side HMI program 37 as described above may be implemented using a variety of third party or proprietary software objects 100, for example, including objects from standard programming languages like Visual Basic, Java or C++ or from operating systems including COM objects, or from other commercial programs that employ objects including graphics programs, and database programs, as well as XML Documents that the invention exposes as objects. In this respect, the term proprietary is intended to indicate only that the protocol is not universally adopted or may be subject to restrictions on use.

Messages from the parser 62 may be routed through an interceptor 102 which may execute a predetermined set of programs based on receipt of the messages, for example, verifying a license or tallying a billing required for a license fee for use of the object if one is required or providing certain security features or the like. The parser 62 then routes the messages to an object provider group 104 via an endpoint decoder 106 as will be described. The object provider group 104 may respond to the message 105 and communicate with an object asserter 108 which in turn may communicate with the network 12.

The object provider group 104 holds object providers 110 that generally provide an interface between a standard object protocol that will be employed in the messages 105 encapsulated in the SOAP envelope 35 and a proprietary software object 100. The object providers 110 are preferably also software objects.

Figure 10:
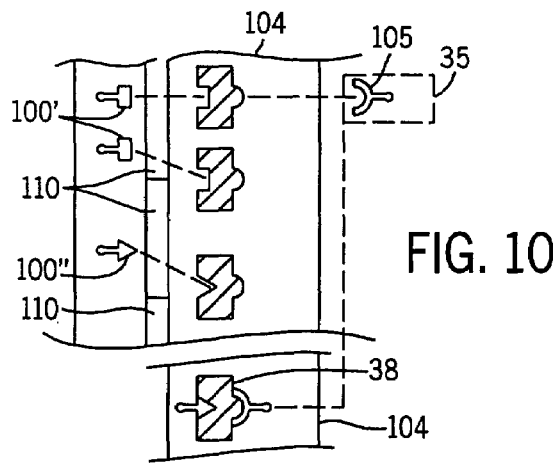
FIG. 10 is a partial, detailed view of FIG. 9 showing object providers as plugged into the server framework as relating to particular proprietary objects and showing an object communication message adhering to the standard object protocol, and a instanced object formed by the combination of a proprietary object and an object provider.

Referring now to FIG. 10, a message 105 using the standard object protocol delivered via the SOAP protocol 35 for access to the object 38 is received by the object provider group 104 and may communicate with a registered object providers 110 or with an instanced object 38 formed of the combination of an instanced object provider 110 and an instanced proprietary object 100.

The former case, communication with the uninstanced object provider 110 is used for messages 105 requiring discovery or construction of an object. The object provider 110 is written to respond to the discovery instructions related to the particular object 100 for which it is intended and includes constructor methods.

In the latter case, the instanced form of the object provider 110, which forms part of object 38, communicates the message to the instanced form of the proprietary objects 100. By encapsulating the communication between the message 105 and the proprietary objects 100 in the structure of the object provider 110, the reliability of the interface process may be ensured. An instance of the object provider 110 and an instance of a software proprietary object 100 create an object 38

Generally proprietary objects 100 may include objects 100' and 100" from different vendors and having different protocols. When instanced, the object provider 110 maps methods, events and parameters of the objects 100 and 100' and the protocols for accessing these methods and parameters and subscribing (or canceling a subscription) to these events, to methods and parameters and protocols and events of the standard object protocol of message 105. Where parameters are different but functionally transformable to be equivalent, the object provider 110 provides the functional transformation. Where parameters of the objects 100 may be combinations of other parameters, that combination too may be affected by the object provider 110. The object provider 110 may also provide for default parameters and for default message states and affect a change in naming convention and syntax to provide an abstraction of the underlying proprietary software object interface and thus give the programmer a unified and standard programming environment. Some methods not realized by the objects 100 can be implemented by the object providers 110.

In this way, the programmer is insulated from differences in the protocols of the objects 100' and 100".

Figure 11:
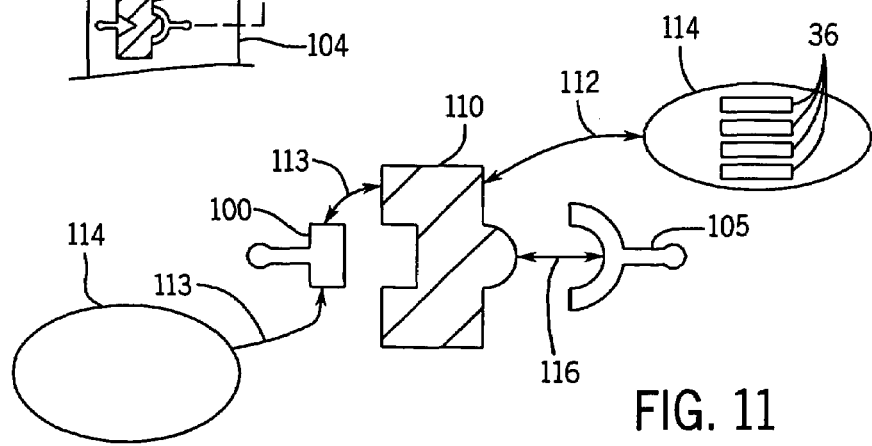
FIG. 11 is a graphical representation of an object provider of FIG. 10 together with an associated proprietary object showing its linkage to various classes and parameter files.

Referring to FIGS. 10 and 11, a number of steps are required before objects 38 being available to the programmer. First, the uninstanced object provider 110 must be registered with the endpoint decoder 106 so that its existence may be revealed to the programmer via the discovery instructions of messages 105. This is done by providing a tag name (e.g., javaObject) that will be used to identify the object provider 110 and linking it to the name of a class (e.g., JavaObjectProvider) that implements the object. This may be done using HTML in the present invention with the following instructions.

```
<rip:object-provider-name = "javaObject"
    className="com.rockwell.integration.providers.object.JavaObjectProvider
"\>
```

These instructions link the tag name of an object provider 110, "javaObject" to a program 114 that implements the object provider 110 and is represented by arrow 112 in FIG. 11. The tag name is revealed in the discover instruction. The program 114 provides the methods that implement the discovery, persistence, constructors, and access features described above for a particular legacy proprietary object 100.

After the object provider 110 has been linked to its underlying program, it must be linked to the particular proprietary object 100. This may be done by the following instructions.

```
<rip:object name ="MyWebObject">
    <rip:object-provider-ref = "javaObject">
        <className>
            com.mycompany.mypackage.MyObject
        <\className>
```

These instructions simply make the connection between the object provider 110 "javaObject" and the proprietary object 100 "MyObject" and provide tag name "MyWebObject" for the proprietary object 100. This allows the proprietary object 100 to be invoked by the object provider 110 and communication between the two to implement the interface when they are instanced. This linkage is indicated by arrows 113 in FIG. 11.

In the next step, the object provider 110 exposes its associated object 100 at a particular endpoint on the network such as a URL by which messages 105 may be received. This may be done by the following instructions.

```
<rip:endpoint uri=\mywebobject" default="MyWebObject">
    <rip:object ref="MyWebObject"/
</rip:endpoint>
```

The endpoint connection is used by endpoint decoder 106 described above with respect to FIG. 9 and is represented by arrow 116 in FIG. 11. This publication process determines what objects are visible at particular Web addresses upon discovery instructions.

At this time a combined object 38 may be instanced formed of an object provider 110 and a proprietary object 100 (shown in FIG. 10) using the instancing instructions described above. Access instructions from messages 105 are directed to the instanced object 38. The objects 38 may communicate with the communications program 64 and may be stored persistently in storage area 42 as has been described above.

It will be understood that a program 114 underlying the object provider 110 must be written for each proprietary object 100. However, using the polymorphism of objects much of the software needed for this process may be easily reused. Features not provided by any of the objects 100 or by a particular proprietary object 100 being used may also be implemented by the object provider 110 serving both as a object and as a virtual object for some object methods. In this respect, the object provider 110 may communicate directly with the asserter 108.

It is specifically intended that the present invention not be limited to the embodiments and illustrations contained herein, but that modified forms of those embodiments including portions of the embodiments and combinations of elements of different embodiments also be included as come within the scope of the following claims.

We claim:

1. An object based interface for an industrial control system comprising:
    a server program that receives communications from a client program that employs a standard object protocol, which includes discovery instructions, the client program communicates with the server program over a network;
    a set of software objects including at least two third-party objects having differing proprietary object protocols also differing from the standard object protocol; and
    at least two object providers that each communicate with the server program and one proprietary object to translate between standard object protocol and an associated one of the proprietary object protocols, the object providers expose proprietary objects that are associated with a URL and respond to the discovery instructions via identification of object features of software objects with which they are associated, wherein an interceptor monitors communications between the server program and the object providers and performs at least one of verifying license validity and recording a fee for use of an object;
    whereby objects from multiple vendors may be simply utilized by the client program.

2. The object based interface of claim 1, the standard object protocol controls object features selected from the group consisting of: object creation, object destruction, setting parameters of the objects, invoking methods of the objects, subscribing to events of objects, and canceling event subscriptions.

3. The object based interface of claim 1, the proprietary object protocol controls object features selected from the group consisting of: object creation, object destruction, setting parameters of the objects, invoking methods of the objects, subscribing to events of objects, and canceling event subscriptions.

4. The object based interface of claim 1, the object features identified are selected from the group consisting of: parameters of the objects, the methods of the objects, and events of the object.

5. The object-based interface of claim 1, the object providers are software objects that provide encapsulation of data passed to proprietary software objects.

6. The object based interface of claim 1, proprietary software objects are selected from the group consisting of Java, Com, C++, XML, and Visual Basic objects.

7. The object based interface of claim 1, further including an asserter that communicates with the object providers and the proprietary software objects that execute a predetermined program in response to such communications.

8. The object based interface of claim 1, including an Internet interface, the client program communicates with the server program through the Internet interface.

9. The object based interface of claim 1, the client program is a Java applet.

10. The object based interface of claim 1, the software objects include graphic display elements.

11. The object based interface of claim 1, the software objects include graphic control elements.

12. A method for communicating with an industrial control system comprising:
receiving at a server program, standard object protocol communications, including discovery instructions, from a client program that communicates with the server program over a network; and
translating by means of an object provider between the standard object protocol communications and at least one proprietary object protocol associated with proprietary software objects including at least two third-party objects having differing proprietary object protocols also differing from the standard object protocol, the object provider exposes proprietary objects that are associated with a URL and responds to the discovery instructions by identifying object features of software objects with which they are associated, wherein an interceptor monitors communications between the server program and the object provider and executes a predetermined program in response to such communications;
whereby objects from multiple vendors may be simply utilized by the client program.

13. The method of claim 12, the standard object protocol controls object features selected from the group consisting of: object creation, object destruction, setting parameters of the objects, invoking methods of the objects, subscribing to events of objects, and canceling event subscriptions.

14. The method of claim 12, the proprietary object protocol controls object features selected from the group consisting of: object creation, object destruction, setting parameters of the objects, invoking methods of the objects, subscribing to events of objects, and canceling event subscriptions.

15. The method of claim 12, the object features identified are selected from the group consisting of: parameters of the objects, methods of the objects, and events of the objects.

16. The method of claim 12, the object providers expose a common software interface that provides an abstraction of the underlying proprietary software object interface.

17. The method of claim 12, the proprietary software objects are selected from the group consisting of Java objects, XML objects, COM, C++, and Visual Basic objects.

18. The method of claim 12, the predetermined program performs at least one of the tasks of verifying license validity and recording a fee for use of the object.

19. The method of claim 12, communicating between the object providers and an assertor program executing a predetermined program in response to such communications.

20. The method of claim 12, the client program communicates with the server program through the Internet.

21. The method of claim 12, the client program is Java applet.

22. The method of claim 12, the software objects include graphic display elements.

23. The method of claim 12, the software objects include graphic control elements.

* * * * *